United States Patent [19]

Mecca

[11] 4,014,160
[45] Mar. 29, 1977

[54] FOLIAGE AGITATING MEANS FOR HARVESTING MACHINES

[75] Inventor: Vito M. Mecca, North Collins, N.Y.

[73] Assignee: Mecca Bros. Inc., North Collins, N.Y.

[22] Filed: May 8, 1975

[21] Appl. No.: 575,520

[52] U.S. Cl. .............................................. 56/330
[51] Int. Cl.² ...................................... A01D 46/00
[58] Field of Search ............................ 56/330, 331

[56] References Cited
UNITED STATES PATENTS

| 3,439,482 | 4/1969 | Orton | 56/330 |
| 3,611,689 | 10/1971 | Patzlaff | 56/330 |
| 3,685,266 | 8/1972 | Mohn et al. | 56/330 |
| 3,774,381 | 11/1973 | Burton | 56/330 |
| 3,890,775 | 6/1975 | Bruel | 56/330 |

Primary Examiner—Russell R. Kinsey
Attorney, Agent, or Firm—Christel & Bean

[57] ABSTRACT

An ambulatory supporting frame provided with wheels is adapted for longitudinal movement along a row of plants by a separate vehicle. A shaker means carried by the frame includes a plurality of beater elements, in the form of fingers or rods, which extend toward opposite sides of the row of plants and bear against the foliage of the plants. The finger elements are resiliently coupled to an oscillating means carried by the frame in a manner imparting a whipping motion to the fingers, and all the finger elements are oscillated simultaneously in the same direction toward and away from the row of plants. The removed crops are collected by a movable floor and pair of laterally spaced conveyors, and the movable floor elements are mounted in a manner permitting adjustment of the degree of inclination of the floor elements enabling an assembly of additional shaker elements adjacent to the lower region of the machine to remove crops which grow relatively close to the ground.

9 Claims, 11 Drawing Figures

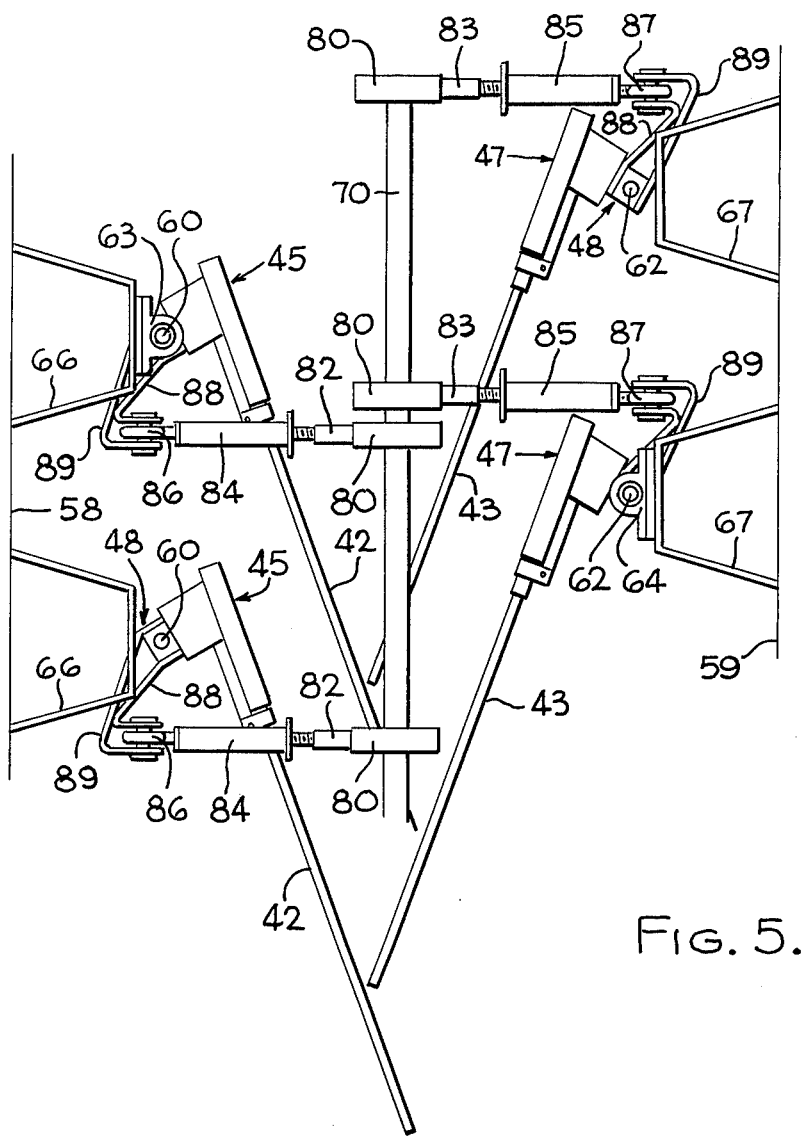
Fig. 5.
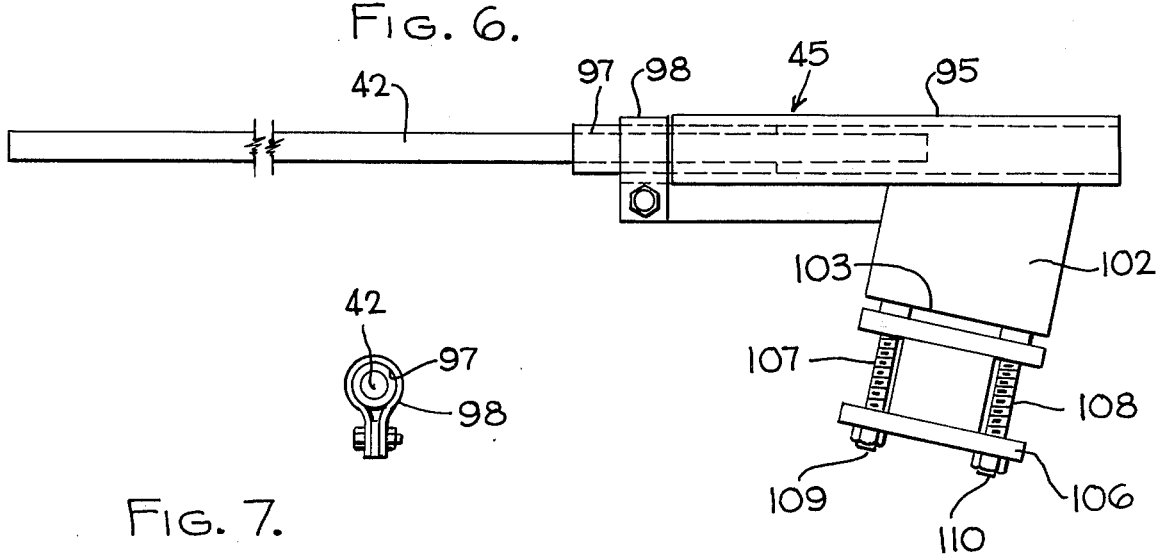
Fig. 6.
Fig. 7.

FOLIAGE AGITATING MEANS FOR HARVESTING MACHINES

BACKGROUND OF THE INVENTION

This invention relates to harvesting machinery, and more particularly to a machine for harvesting crops from bushes or vines planted in rows.

Mechanical harvesting of crops, for example grapes, is highly desirable in being faster and cheaper than manual labor. Machinery has been proposed which employs vibratory or agitating means for detaching crops, for example grapes, from vines or bushes. The peculiar problems associated with harvesting, however, impose many significant performance requirements on such machinery. For example, there should be maximum removal of the crops with minimum injury or damage thereto. The machinery should have the capability of harvesting crops at various heights, including those crops which grow relatively close to the ground. In addition it would be highly desirable to provide such machinery which harvests crops effectively without excessive energy requirements.

SUMMARY OF THE INVENTION

The present invention provides a harvesting machine for row crops including a shaker means carried by a frame movable along a row of plants which shaker means includes a plurality of beater elements in the form of fingers or rods which are arranged and agitated in a manner effecting a highly efficient removal of crops from the plants. The finger elements extend from the frame toward opposite sides of the row to bear against the foliage of the plants, and the finger elements are resiliently coupled to an oscillating means carried by the frame in a manner imparting a whipping motion to the finger elements upon oscillation thereof to shake the crops off the plants. In addition, each finger element is oscillated about a generally vertical axis which is generally perpendicular to the longitudinal axis of the finger element, all the finger elements being oscillated simultaneously in the same direction toward and away from the row of plants. The harvesting machine also includes a pair of laterally spaced conveyors and corresponding collectors adjustably mounted to vary the degree of inclination thereof and an assembly of additional shaker elements adjacent the lower region of the machine for removing crops which grow relatively close to the ground.

By way of illustration the present invention will be described with particular reference to harvesting machinery of the type wherein crops growing on bushes or vines planted in rows are agitated, although the principles of the invention may be variously applied. While a single specific embodiment of the principles of the present invention is illustrated in the accompanying drawing and described in detail in the following specification, it is to be understood that such embodiment is by way of example only and that various mechanical modifications may be made without departing from the spirit and scope of the present invention.

BRIEF DESCRIPTION OF THE DRAWING FIGURES

FIG. 5 is a fragmentary top plan view of the shaker means of FIG. 4;

FIG. 6 is an enlarged elevational view part broken away showing a finger element and bracket of the shaker means of FIGS. 4 and 5;

FIG. 7 is a fragmentary end elevational view of the apparatus of FIG. 6 taken from the left hand and thereof;

DETAILED DESCRIPTION OF THE ILLUSTRATED EMBODIMENT

A harvesting machine of the present invention includes an ambulatory supporting frame 10 which is adapted for longitudinal movement along a row of plants. The frame includes, briefly, vertical end members 11–14 and upper horizontal side members 15 and 16. Each side of the frame also includes an intermediate member, one shown at 20 in FIG. 2, which in the present instance is disposed generally diagonally. The frame members thus are arranged so as to enable a machine to straddle a row of plants or vines as it is moved longitudinally along the row. A pair of wheels 22, 23 are rotatably connected to the frame member by means of corresponding axles 24, 25.

Figure 2:
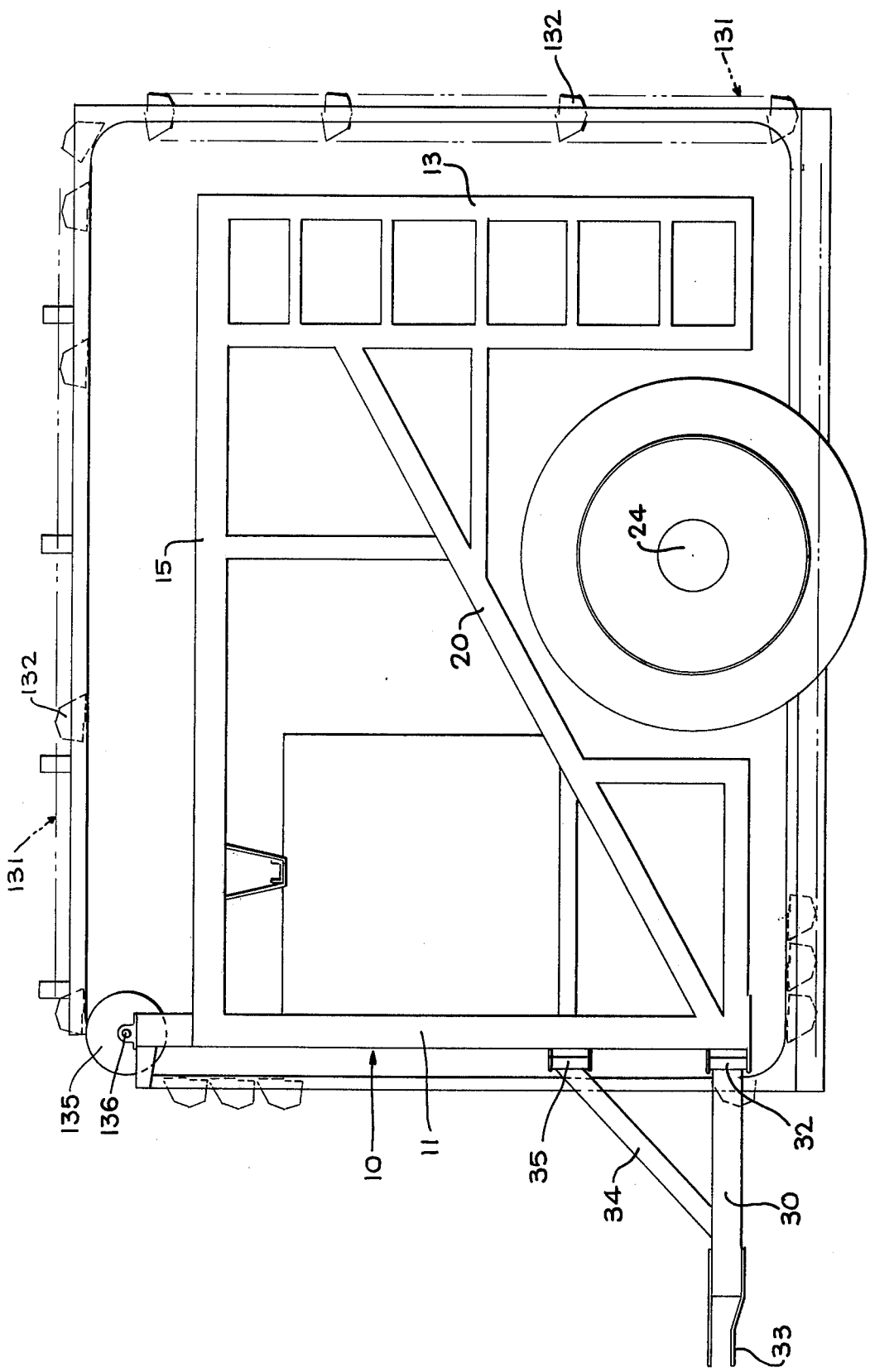
FIG. 2 is a fragmentary side elevational view of the harvesting machine of FIG. 1.

The machine of the present invention is of the type adapted to be moved along a row of plants by a separate vehicle, for example a tractor. A suitable arrangement thus is provided for connecting the frame 10 to the vehicle which will draw it. As shown in FIG. 2, a generally horizontal bar 30 is connected by means of a suitable bracket 32 to one of the frame members and near the lower portion of frame 10. A conventional hitch 33 is included on bar 30 for connection to the vehicle and preferably a supporting arm 34 is connected at one end to bar 30 and at the other end through a bracket 35 to frame 10.

The harvesting machine of the present invention further comprises crop removing means in the form of shaker means, generally designated 40, carried by the machine frame and including a plurality of foliage agitating members or beater elements which extend from opposite sides of the machine toward opposite sides of the row of plants when a machine is moved along the row. In accordance with the present invention, the foliage agitating members or beater elements comprise fingers or rods 42 and 43 extending inwardly from opposite sides of the machine. The elongated fingers 42 at the left-hand side of the machine as viewed in FIGS. 1–3 comprise a plurality of vertical series, in the present illustration two vertical series, with each rod being coupled through a corresponding bracket 45 to a vertical post element 46 pivotally connected at the upper and lower ends thereof to the machine frame as shown in detail FIGS. 4 and 5. Similarly, the fingers 43 at the opposite side of the machine are arranged in a plurality, i.e. two, of vertical series, and likewise each rod 43 is coupled through a corresponding bracket 47 to a vertical post element 48, pivotally connected at the upper and lower ends thereof to the machine frame as shown in FIGS. 4, 5. There is, of course, a vertical post element provided for each vertical series of fingers, and in the machine of the present illustration two vertical post elements are provided on each side of the machine making a total of four vertical posts.

It will be particularly noted that the beater elements or fingers 42 atone side of the machine are staggered longitudinally with respect to the beater elements or fingers 43 at the opposite side of the machine so that, in effect, the foliage is pushed first in one direction and then the other as the machine moves along the row. In addition, the finger elements 42, 43 at opposite sides of the machine are mounted and driven to move simultaneously in the same direction relative to the vertical axis of the machine, i.e. a vertical line parallel to vertical components of the machine frame such as vertical end members 11-14 and to the vertical axes of the post elements, i.e. as the beater elements on one side of the machine move toward the center of the row of plants, the beater elements on the opposite side move away from the center of the row of plants, and vice versa, during machine travel for further agitating the foliage. The elongated beater elements 42, 43 preferably are disposed so that the longitudinal axes thereof extend rearwardly relative to the forward direction of travel of the machine as shown in FIG. 3.

The means for mounting the beaters at each side of the machine now will be described. The vertical post elements 46 and 48 are provided with shaft or rod portions 50 and 52, respectively, at the bottom or lower ends thereof as shown in FIG. 4. Rod portions 50 and 52, in turn, are journalled in bearing elements 53 and 54, respectively, which are secured to brackets 55 and 56, respectively, fixed to frame members 58 and 59, respectively, of the machine frame. Brackets 55, 56 are located near the bottom or lower portion of the machine frame at a level near the wheel axles 24 and 25. Similarly, the vertical post elements 46 and 48 are provided with upper rod or shaft portions 60 and 62, respectively, which are journalled in bearing elements 63, 64, respectively, which are secured to brackets 66 and 67, respectively, fixed to the top portions of frame elements 58 and 59 respectively. The harvesting machine of the present invention includes oscillating means carried by the machine frame for oscillating each of the beater elements or fingers 42, 43 about an axis generally perpendicular to the longitudinal axis of the respective finger element. A crank shaft 70 is journalled in the machine frame at spaced locations therealong. As shown in FIG. 4, a supporting element 72 is fixed to an upper, horizontally disposed machine frame element 74, the supporting element 72 having spaced-apart, vertically depending legs to which is secured a horizontally disposed supporting member 75 containing a bearing element 76 for receiving shaft 70 adjacent one end thereof. A similar arrangement is provided at a location spaced along the machine frame to support shaft 70 adjacent the other end thereof. Shaft 70 is provided with axially spaced throws 80 connected thereon as shown in FIG. 5 which reciprocate connecting rods 82 and 83 on opposite sides of the machine which thread into the ends of corresponding adjusting link elements 84 and 85, respectively, the other ends of which are connected to threaded ball joints 86 and 87, respectively. Each joint, in turn, is coupled through a linkage comprising a pair of arms 88, 89 to the upper end of the corresponding vertical post element. As a result, reciprocation of rods 82, 83 pivots or oscillates posts 46, 48 thereby pivoting or oscillating the finger elements 42, 43 about vertical axes parallel to the vertical axes of posts 46, 48. The initial angular position of the posts 46, 48 and accordingly the initial angular disposition of fingers 42, 43 may be adjusted by turning or rotating link elements 84, 85 in a manner similar to turn-buckles.

The finger elements 42 and 43 are connected to the vertical post members by means of brackets 45 and 47, respectively, in the following manner. Referring now to FIGS. 6 and 7, each bracket, for example connector element or bracket 45, has a generally tubular body portion 95 of metal which receives a tubular element 97 of resilient material such as rubber, into which the corresponding finger element such as rod 42 is fitted. Sleeve 97 has inner and outer diameters of a size providing relatively snug fits within body 95 and on the finger element. The axial length of sleeve 97 in the present illustration is such that about half extends outwardly beyond the end of body 95 receiving the finger element and the remainder extending in body 95 terminates inwardly of the end of the finger element which is in body 95. Tube 97 is secured in place by means of a clamp 98 having a generally C-shaped body which extends around tube 97 and having legs or ends fastened to opposite sides of a longitudinally disposed flange 100 provided exteriorly along the body of element 95. Another flange 102 extends outwardly from body 95 adjacent the other end thereof and terminates in a surface 103 disposed at an acute angle to the longitudinal axes of cylinder 95 and the finger element therein. Flange 102 is connected to a particular one of the vertical posts 46, 48 by means of a pair of plates 105, 106 connected together by spaced apart bolts 107, 108 extending out from surface 103 and having corresponding nuts 109 and 110.

Figure 3:
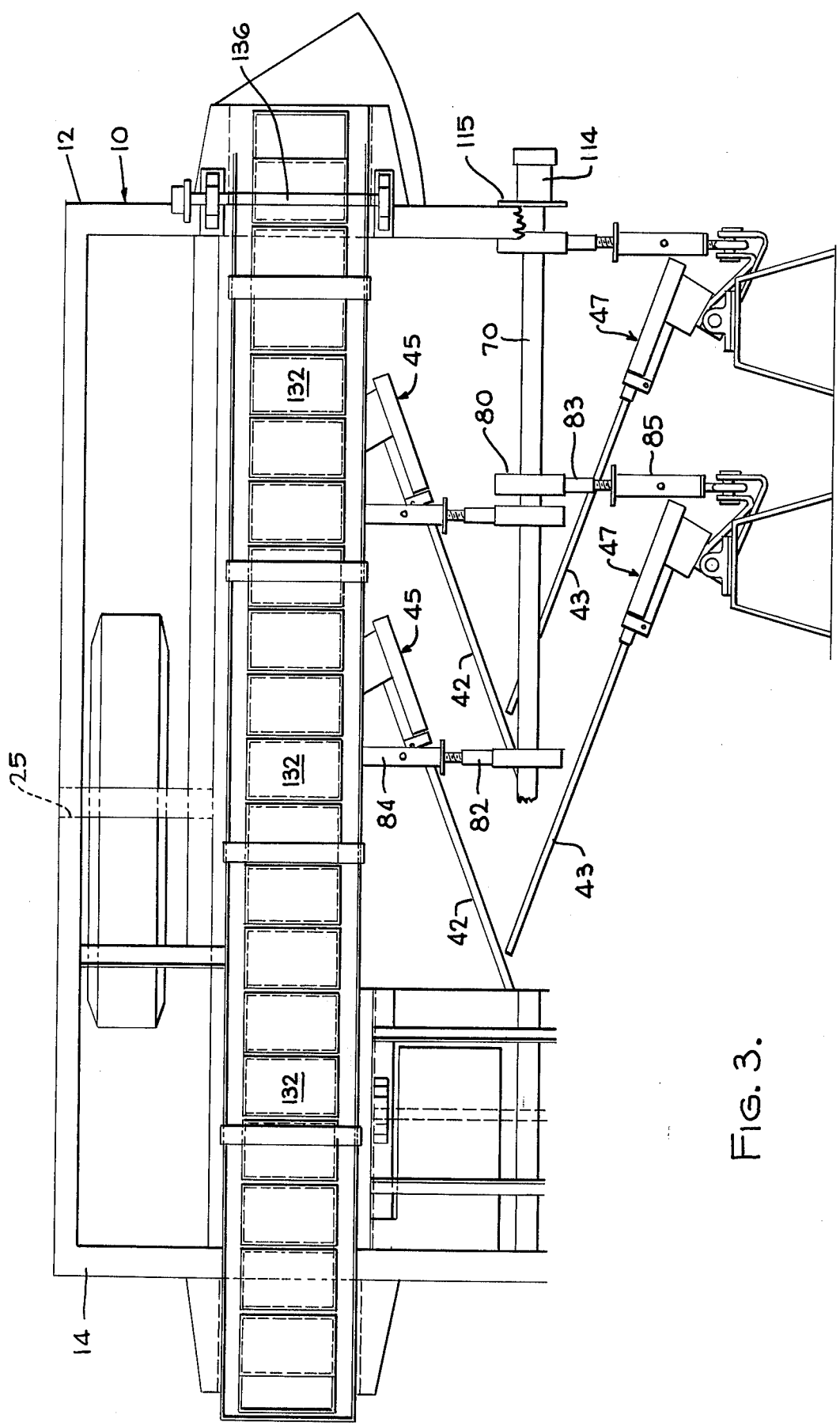
FIG. 3 is a fragmentary plan view of the harvesting machine of FIG. 1.
Figure 4:
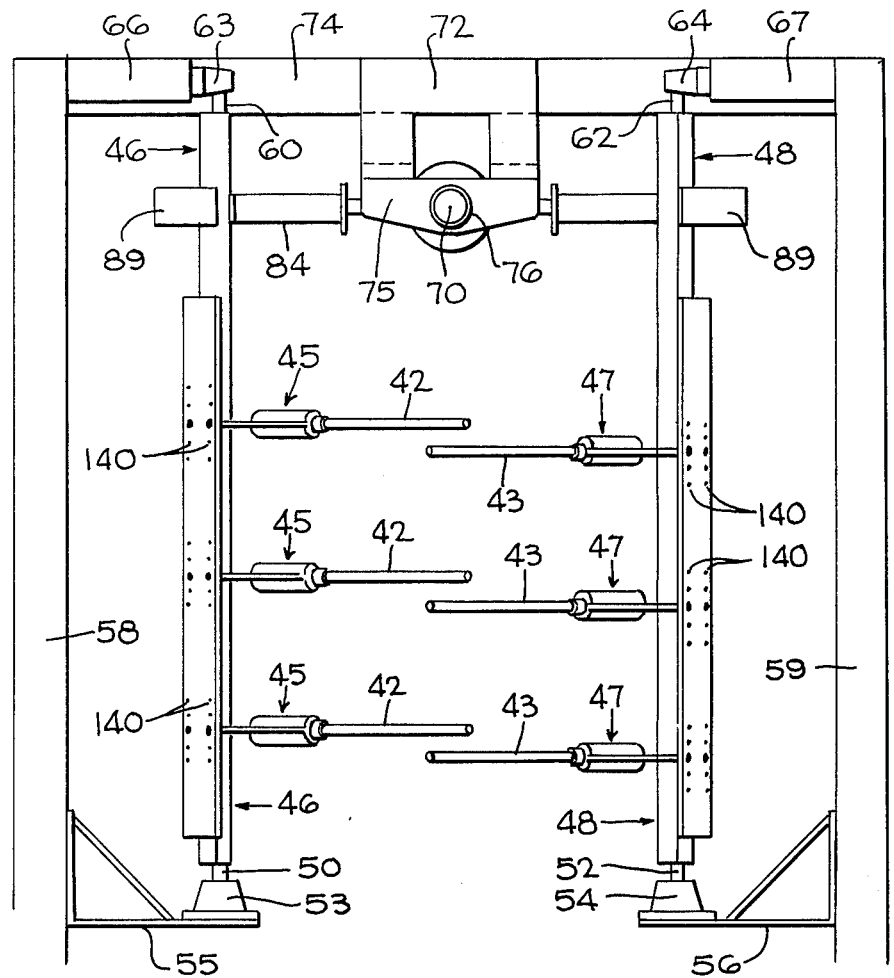
FIG. 4 is a fragmentary elevational view of the shaker means according to the present invention and included in the harvesting machine of FIG. 1.

Crank shaft 70 is rotated by means of a hydraulic motor or similar drive means 114, which, as shown in FIG. 3, can be carried by the crank shaft in which case the motor housing is held against rotation by a torque arm 115 which extends to a fixed portion of the machine framework. As a result, the vertical posts on both sides of the machine are pivoted simultaneously in the same direction, i.e. in phase, to move the beater elements or fingers 42, 43 alternately toward and away from the longitudinal center line of the harvesting machine. As shown in FIG. 5, the rotation of shaft 70 is transformed by throws 80 into reciprocation of the rod 83, link 85 and joint assemblies 87 on one side of the machine and into reciprocation of the rod 82, link 84 and joint assemblies 86 on the other side of the machines, the reciprocations being simultaneously in opposite directions. In other words, the connections of rods 82, 83 to throws 80 are such that as the rod, link and joint assemblies to the right of shaft 70 as viewed in FIG. 5 are moved toward the right, the rod, link and joint assemblies to the left of shaft 70 are moved to the left, and vice versa. Thus, the reciprocations are alternately outwardly of and inwardly toward shaft 70. The foregoing reciprocating movements are transformed by the linkage elements 88, 89 into oscillations or pivoting movements of the post elements 46, 48 about the corresponding vertical axes thereof and simultaneously in the same directions. In other words, as vertical posts 48 on the right-hand side of the arrangement as viewed in FIG. 5 are pivoted in a clockwise directions, the vertical posts 46 on the opposite side are pivoted in a clockwise direction also, and vice versa.

Figure 8:
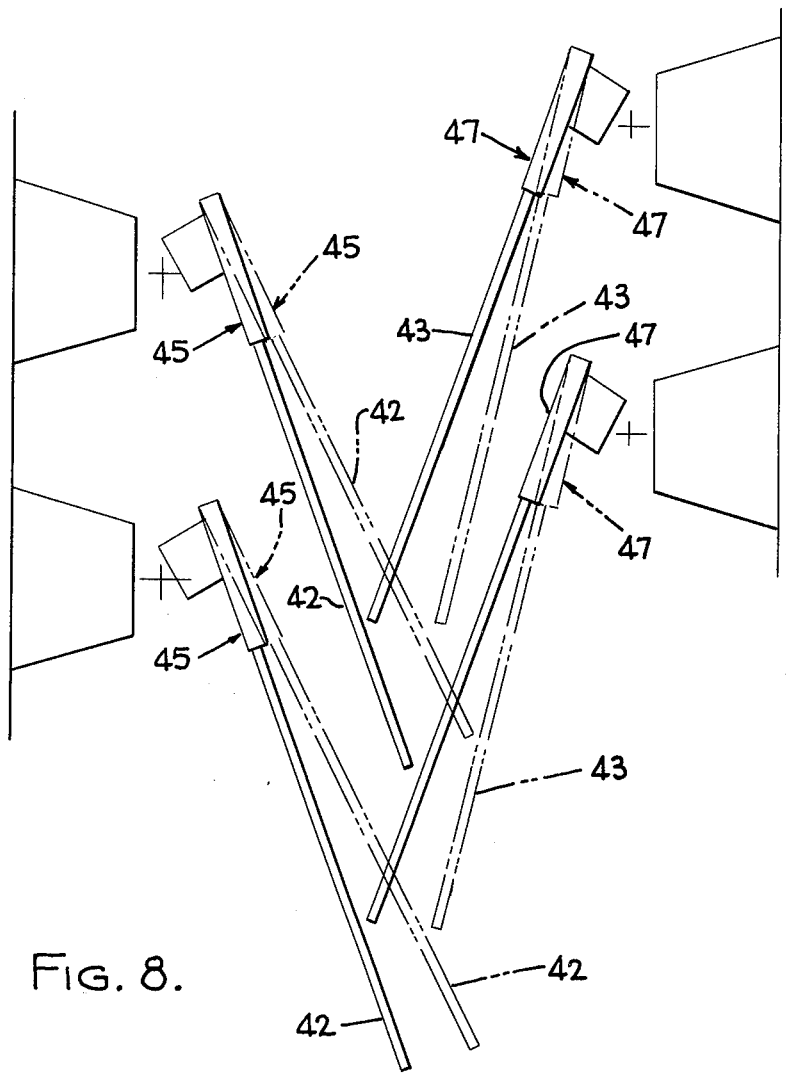
FIG. 8 is a diagrammatic view illustrating the operation of the shaker means of the present invention.

The foregoing is illustrated further in the diagrammatic view of FIG. 8. Assume that the initial position of fingers 42, 43 is that shown in solid lines. A quarter rotation of shaft 70 pivots posts 46, 48 to move fingers 42, 43 all simultaneously to the right to the position indicated in broken lines in FIG. 8. The next quarter rotation of shaft 70 returns fingers 42, 43 to the position indicated in solid lines, and the following quarter rotation of shaft 70 would move fingers 42, 43 all simultaneously to the left from the solid line position as viewed in FIG. 8. The final quarter rotation of shaft 70 returns fingers 42, 43 to the solid line position in FIG. 8 to begin another cycle. Thus, as fingers or rods 43 on the one side of the machine move away from the plants the fingers or rods 42 on the other side of the machine move toward the plants and vice versa. The foregoing is repeated cyclically at high speed thereby oscillating finger elements 42, 43 simultaneously in the same direction.

Figure 1:
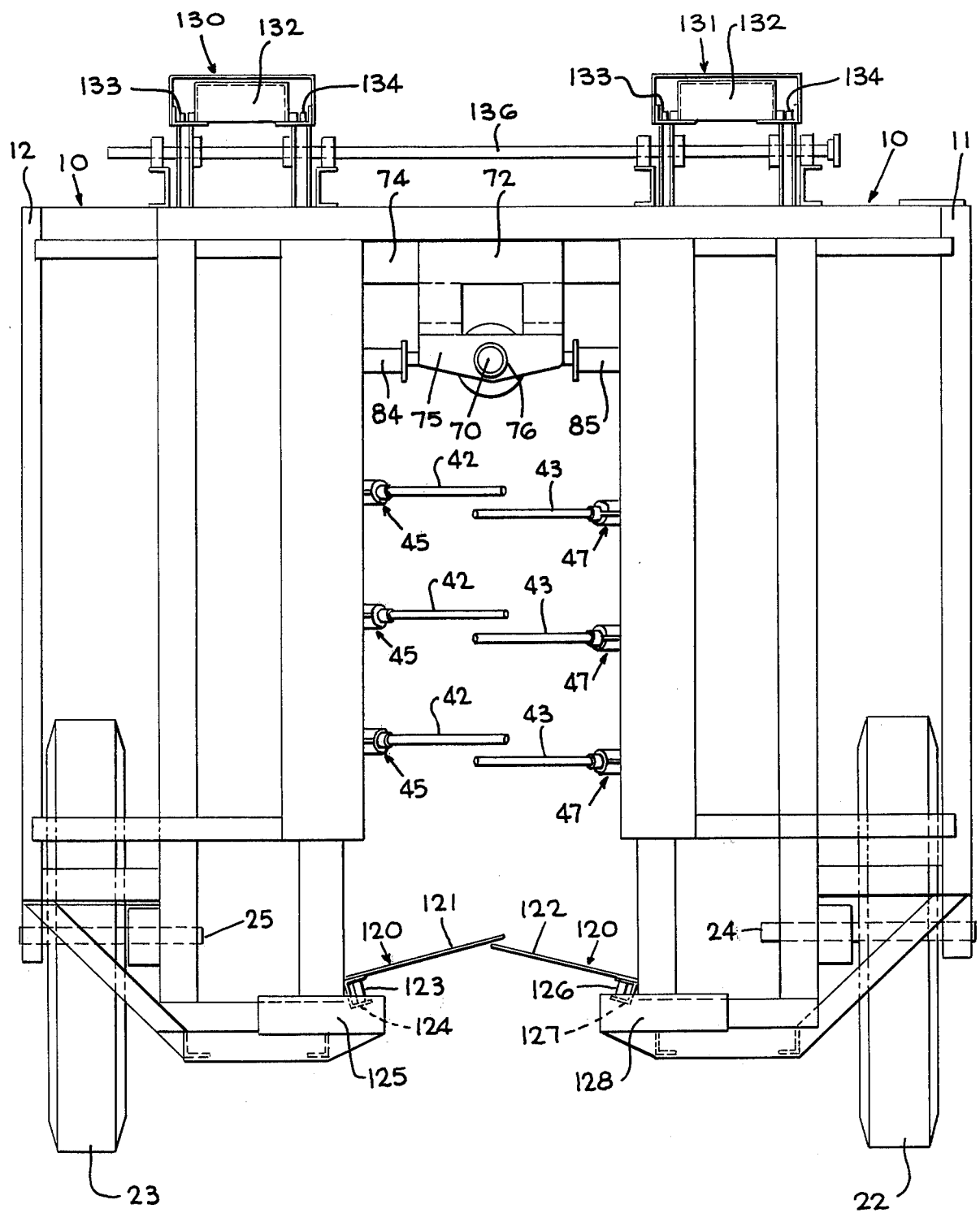
FIG. 1 is a fragmentary elevational view of one end of a harvesting machine according to the present invention.

The harvesting machine further includes components whereby the crops, for example grapes, upon being removed from the plants or vines by action of shaker means 40 first are directed to and collected generally in the lower region of the frame 10, then are conveyed to a zone or point preferably in the upper region of frame 10, and finally are collected by a suitable arrangement and transmitted or conveyed to storage receptacles. Such receptacles, of course, can be carried externally on the frame 10 or carried by a separate vehicle moving along-side of the frame 10. Referring now to FIG. 1, a floor 120 comprises a plurality of first overlapping shutters 121 arranged along one side of the machine and a plurality of second overlapping shutters 122 arranged along the opposite side of the machine. The bank or series of shutters 121 is inclined downwardly and outwardly from the center to the one side of the machine, and the bank or series of shutters 122 is inclined downwardly and outwardly from the center to the opposite side of the machine. Since such flooring arrangements are well-known in the art, a brief description is deemed sufficient. Each shutter, for example shutter 121, is pivotally mounted on a pin 123 which is connected in a channel member 124 which, in turn, is mounted on an inwardly direction portion 125 of the machine frame. Shutter 122 shown in FIG. 1 is connected by a similar arrangement including pin 126, channel member 127 and frame portion 128. Each shutter is held in a normally closed position by a coil spring, (not shown) connected thereto and to the channel member. As a result, the shutters progressively and yieldingly open and close about the plant stems or vines as the machine travels along a row of plants. As shown in FIG. 1, the shutters 121, 122 extend outwardly and downwardly from the center of the machine to insure that the crops which fall onto flooring 120 are directed toward the conveyor system which now will be described.

The conveyor system includes two spaced-apart paths 130, 131 defined by an arrangement of rails or tracks each of which paths, in turn, includes spaced-apart generally horizontal and vertical portions so as to be substantially rectangular. Each path includes a plurality of buckets, one being designated 132, for carrying harvested crops such as grapes, and the buckets of each path are moved by an endless chain, for example two chains 133, 134 in each path connected to the buckets and to a drive means. The latter comprises conveyor drive motor and flywheel 135 mounted on machine frame 10 which is drivenly coupled to chains 133, 134 by a shaft 136 and an arrangement of sprockets (not shown).

The lower portions of the conveyor paths are at a level whereby crops moving outwardly along flooring 120 are received by the conveyor buckets upon leaving the outermost edges of the the flooring members. The buckets travel in a carrying position along the lower portion of the frame 10 to the end remote from shaker 40 as best seen in FIG. 2, whereupon they travel upwardly in a generally vertical direction for a distance substantially equal to the height of the machine frame 10. Near the upper righthand corner of frame 10 as viewed in FIG. 2, the buckets are pivoted so as to discharge their contents into an arrangement for collecting the crops and transferring them from the machine. One preferred arrangement includes a conveyor belt (not shown) positioned in the machine frame to receive discharged crops adjacent one end extending laterally outwardly from the harvesting machine to be carried by frame 10. For a more detailed description of the conveyor system reference can be made to my pending application Ser. No. 575,519 filed May 8, 1975 entitled Conveyor Means For Harvesting Machines and assigned to the same assignee as the present invention.

In operation, the harvesting machine is moved, for example by a tractor, through a field of bushes or vines planted in rows in a manner whereby the vines or bushes are straddled by the machine frame 10 and, hence, by shaker means 40. The front end of the machine is at the left hand side as viewed in FIG. 2 and at the right hand side as viewed in FIG. 3. Suitable controls (not shown) are provided for the drive motors 114 and 135. Vibratory or agitating motion is imparted by the fingers or rods 42, 43 to the plants contacted thereby and causes the crops such as grapes to be removed whereupon they fall onto the flooring 120. In particular, the beater elements in the form of fingers or rods 42, 43 are positioned to bear against the foliage of the plants, and the staggered arrangement of beater elements 42, 43 relative to opposite sides of the machine pushes the foliage first in one direction and then in the other as the machine moves along a row. The plants are agitated further by the oscillating movement of the beater elements 42, 43 simultaneously in the same direction during machine travel. Shaft 70, being rotated by motor 114, reciprocates the arrangement described above to oscillate vertical posts 46, 48 and the corresponding fingers or rods 42, 43 connected thereto rapidly and in a manner such that the beaters 42, 43 move to one side in unison and then to the opposite side in unison relative to the row of plants as previously described.

In the present illustration, there are two vertical series of beater elements 42 on one side of the machine and two vertical series of beater elements 43 on the opposite side of the machine, each vertical series, in turn, including three beater elements. The number of beater elements in each series and the vertical position of the elements are varied in accordance with different harvesting conditions as determined, for example, by the variety of grape, the type of terrain, and the position of the trelis wire. When the crops are shaken from the plants they fall onto flooring 120 whereupon they are transported by the conveyor system to suitable storage receptacles in a manner as previously described.

Providing beater elements in the form of round rods 42, 43 in the machine of the present invention advantageously gives better results in harvesting grapes. The oscillating rods 42, 43 provide whole grapes being removed from the plants and do not tend to break the skin of the grapes thereby resulting in little or no juicing or similar damage to the grapes. In conjunction with these advantages, the mounting arrangement of the present invention advantageously provides long wear life of the rods while at the same time improving machine efficiency. In particular, rods 42, 43 are resiliently mounted in brackets 45 and 47, respectively, by the resilient sleeves 97 so as to avoid the problem of rod breakage. The resilient mounting of rods 42, 43 together with the rods being of sufficient length provides a whipping action in the rods which improves machine efficiency. In particular, with the whipping action of the rods, the speed of operation of motor 114 and shaft 70 is reduced from about 400 r.p.m. to about 300 r.p.m. while maintaining the same degree of effectiveness of harvesting. This advantageously lowers the machine energy requirements.

Rods 42, 43 preferably are of plastic or fiberglass material although metal rods also can be employed. Having rods 42, 43 each of a diameter of about 0.75 inch and a length of about 48 inches has provided favorable results. By way of illustration spacing the posts 46, 48 about one foot in a horizontal longitudinal direction with the relatively long rods 42, 43 disposed at a relatively small acute angle to the longitudinal axis of the machine results in a relatively greater effective use of rods. In addition, brackets 45, 47 mount the rods 42, 43 in a manner such that each rod is spaced from its corresponding post 46, 48 rather than mounting the rods such that they touch the posts. In other words, the brackets mount the rods in a manner such that the longitudinal axis of each rod is spaced from, i.e. does not intersect, the vertical axis of the corresponding post. This increases the amount of the end of each rod which is used in harvesting. Corresponding rods 42, 43 on opposite sides of the machine are spaced apart by a gap of about 2 inches to avoid any scissoring action on the plants. The vertical location of the brackets and corresponding rods are changeable by virtue of a series of mounting apertures 140 provided vertically along post elements 46, 48.

The initial angle or rest position of fingers or rods 42, 43 can be adjusted by turning or rotating link elements 84, 85 manually as previously described. This adjustment accommodates different sizes of plant stems. In addition, the maounting of rods 42, 43 spaced from posts 46, 48 as described above is advantageous when the angle of the rods 42, 43 is adjusted enabling a greater amount of the rods at the ends to operate on the plants. The rods are releasably connected in the brackets, for example by the arrangement of clamp 98 and sleeve 97 releasably holding rod 42 in bracket 45 illustrated in FIGS. 6 and 7, so that the rods are longitudinally adjustable. The longitudinal adjustment enables relatively long rods to be employed, the rods being installed in brackets 45, 47 with the opposite ends extending outwardly beyond the brackets if desired so that they can be moved in upon release of clamp 98 to compensate for wear on the inner ends whereupon clamps 98 are tightened to hold the rods in the new position. Furthermore, if the harvesting end of a rod should happen to be damaged, the clamp simply can be loosened, the rod withdrawn from the bracket and reinserted in inverted position and the clamp tightened.

The mounting of rods 42, 43 in a manner providing some play in the mounting, in particular, a resilient mounting, to generate the shipping motion, together with the manner of oscillating rods 42, 43 so that the rods move to one side in unison and then to the opposite side in unison results in efficient and effective harvesting. The effective shaking action imparted to the plants provides a maximum removal of crops with little or no damage to either the crops or the plants and in a manner removing little or no leaves and other unwanted material from the plants. The oscillating rods have relatively low inertia and provide a relatively smooth running shaker apparatus and harvesting machine. The foregoing advantageous operating characteristics are provided by a machine which is relatively simple in construction and relatively easy to operate and maintain in an efficient manner.

Figure 10:
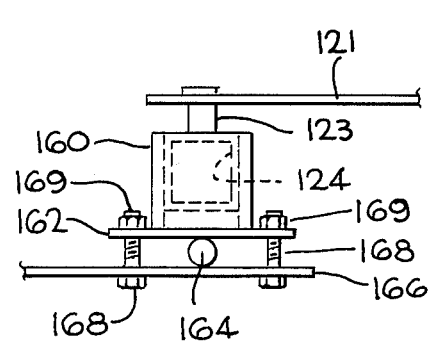
FIG. 10 is a fragmentary elevational view of an adjustable mounting arrangement for the collector flooring in the harvesting machine of the present invention.
Figure 11:
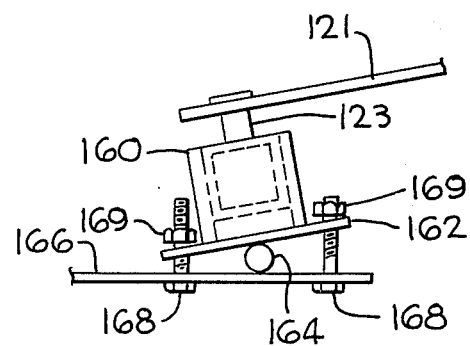
FIG. 11 is a view similar to FIG. 10 and showing the flooring after adjustment to a different degree of inclination.
Figure 9:
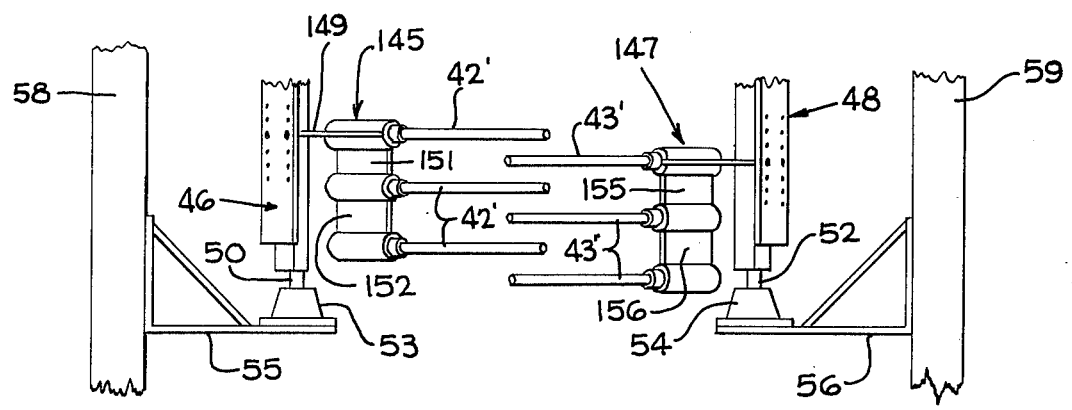
FIG. 9 is a fragmentary elevational view illustrating additional shaker elements in shaker means of the present invention for removing crops growing relatively close to the ground.

FIGS. 9–11 illustrate components of the harvesting machine of the present invention enabling it to harvest crops from plants which grow relatively close to the ground. As shown in FIG. 9, an assembly of additional shaker elements is connected to the depending post elements 46, 48 of the shaker means. The additional shaker elements comprise a plurality of fingers or rods 42', 43' which are similar to the rods 42, 43 previously described. The rods 42', 43' are coupled by brackets to posts 46, 48 adjacent the lower ends of the posts and in a manner such that at least one rod of each assembly is positioned inwardly of and generally below the lower end of the corresponding depending post element. In particular, there are three rods 42' in the present illustration connected by a single bracket 145 to post 46, and three rods 43' connected by a single bracket 147 to post 48. Rods 42' are received in corresponding sleeve elements of bracket 145, and each sleeve can be fitted with an intermediate sleeve of resilient material such as rubber in a manner similar to bracket 45 illustrated in FIG. 6 to provide a resilient mounting for each rod 42'. The upper-most sleeve of bracket 145 is fixed to a horizontally disposed flange 149 which is secured to post 46 by an arrangement similar to that associated with flange 102 shown in FIG. 6. The two lower sleeves are fixed to each other and to the upper sleeve by vertically disposed flanges 151, 152 shown in FIG. 9. Similarly, rods 43' are received in resilient sleeves fitting in rigid sleeves of bracket 147 which has an upper horizontally disposed mounting flange 154 and vertical connecting flanges 155, 156. Preferably, another pair of additional rod assemblies would be provided adjacent the lower ends of the two other post elements 46, 48. The additional rods 42', 43' are oscillated in unison with the other rods 42, 43 coupled to the corresponding post element, and the rods 42', 43' provide a whipping motion similar to that of rods 42, 43.

In conjunction with the additional shaker elements, the degree of inclination of each series of shutters 121, 122 is adjustable. In particular, each bank or series of shutters comprises a collector positioned along a corresponding one of the conveyor paths 130, 131 and normally inclined downwardly from the center of the machine laterally toward the corresponding conveyor. There is provided means for mounting each of the collectors for pivotal movement about an axis generally parallel to the corresponding one of the conveyors in a manner permitting movement of the collectors between inclined and generally horizontal positions, the mounting means including means for maintaining the collectors in a selected position. FIGS. 10–11 illustrate a mounting means for the collector comprising shutters 121 on the one side of the machine, there being an identical mounting means provided for the shutters 122 on the opposite side of the machine. Channel element 124 which carries pins 123 and shutters 121 is fixed at one end to an upstanding member 160 having a base plate or flange 162. A rod or pin element fixed such as by welding to the undersurface of plate 162 rests on the upper horizontal surface of a machine frame member 166 associated with frame portion 125. A pair of bolts 168 and corresponding nuts 169 connect plate 162 to frame 166 on opposite sides of rod 164. The other end of channel element 124 is simply pivotably mounted in the machine frame by any suitable arrangement.

The mounting arrangement is shown in FIG. 10 holding shutters 121 in a generally horizontal position which is maintained by bolts 168 and nuts 169 engaging plate 162 and frame 166. The shutters are moved to an inclined position simply by tightening the left-hand nut 169 as viewed in FIGS. 10 and 11 thereby moving the left-hand end of plate 162 closer to frame 166 and pivoting the assembly on rod 164 to the position shown in FIG. 11 which is maintained by the engagement of bolts 168 and corresponding nuts 169 with flange 162 and frame 166. Various degrees of innclination are obtainable as determined by the amount of adjusment of the bolt and nut.

The combination of additional shaker elements 42', 43' and adjustable inclination of flooring 120 enables the machine of the present invention to harvest crops which grow relatively close to the ground, such as grapes found in Australia and South Africa growing as close as about six inches to the ground. The lowermost rod 42', 43' of the assembly can be located below the bottom portion of the corresponding post element 46, 48 and the flooring 120 can be adjusted to a nearly horizontal position as shown in FIG. 10. Thus the flooring 120 can be located relatively close to the ground and the lowermost rods 42', 43' located relatively close to the flooring. The arrangement of the present invention maintains an open or clear space along the entire length of the machine between the beater elements and both laterally spaced conveyors so that no harvested crops will clog in the machine and be unable to reach the conveyors. If the vertical posts 46, 48 were to be extended at the lower ends thereof below the normal positions thereof to accommodate low growing crops, this would undesirably provide obstructions between the region of the beaters and the lower conveyor paths which could cause clogging or gathering of crops during harvesting.

It is therefore apparent that the present invention accomplishes its intended objects. While a single embodiment of the present invention is described in detail, this is done for purposes of illustraton, not limitation.

I claim:

1. A harvesting machine for row crops comprising:
   a. a frame movable along a row of plants in a manner straddling the row;
   b. shaker means carried by said frame and including a plurality of elongated finger elements;
   c. oscillating means carried by said frame for oscillating each of said finger elements about an axis generally perpendicular to the longitudinal axis of the finger element;
   d. a corresponding plurality of connecting means for connecting each of said finger elements to said oscillating means, each of said connecting means comprising a hollow element of resilient material into which the corresponding finger element is fitted and a connector element fixed to said oscillating means and receiving said resilient element and said finger element in a manner providing some play in the connection of each of said finger elements to said oscillating means; and
   e. said finger elements being of sufficient length to enable said resilient elements to impart a whipping motion to said finger elements upon oscillation thereof to shake the crops off the plants.

2. A harvesting machine as defined in claim 1, wherein said finger elements are spaced generally vertically and extend inwardly from opposite sides of said machine to bear against the foliage of the plants.

3. A harvesting machine as defined in claim 2, wherein the finger elements of one side of said machine are staggered longitudinally relative to the finger elements of the opposite side of said machine.

4. A harvesting machine as defined in claim 1, wherein each of said fingers elements comprises a rod.

5. A harvesting machine as defined in claim 2, wherein each of said finger elements is disposed so that the longitudinal axis thereof is generally horizontal and extends rearwardly relative to the forward direction of travel of said machine along the row.

6. A harvesting machine as defined in claim 2, wherein said finger elements are arranged in a vertical series, there being a plurality of said series on each side of said machine.

7. A harvesting machine as defined in claim 1, wherein said connecting means includes permitting longitudinal adjustment of said finger elements.

8. A harvesting machine for row crops comprising:
   a. a frame movable along a row of plants in a manner straddling the row;
   b. shaker means carried by said frame and including at least one depending element on each side of said frame and shaker elements on said depending elements and extending inwardly from opposite sides of said machine;
   c. means carried by said frame for moving said shaker elements to shake the crops off the plants;
   d. a pair of laterally spaced conveyors on said machine for transporting removed crops, each of said conveyors having a portion spaced below said shaker means in a manner providing a space between the conveyor and the lower end of the corresponding depending element of said shaker means;
   e. a pair of collectors, each collector being positioned along a corresponding one of said conveyors and normally inclined downwardly and laterally toward said one of said conveyors;
   f. means for mounting each of said collectors for pivotal movement about an axis generally parallel to the corresponding one of said conveyors in a manner permitting movement of said collectors between inclined and generally horizontal positions, said mounting means including means for maintaining said collectors in a selected position; and g. an assembly of additional shaker elements connected to a corresponding one of each of said depending elements of said shaker means, each of said assemblies including at least one shaker element positioned inwardly of and below the lower end of the corresponding one of said depending elements thereby maintaining said space between the corresponding conveyor and the lower end of said depending element.

9. A harvesting machine as defined in claim 1, wherein each of said finger elements comprises a round rod.

* * * * *